US010608908B2

(12) United States Patent
Sreeramoju et al.

(10) Patent No.: US 10,608,908 B2
(45) Date of Patent: Mar. 31, 2020

(54) ON-DEMAND CONNECTION PING

(71) Applicant: NICIRA, INC., Palo Alto, CA (US)

(72) Inventors: Akshay Kumar Sreeramoju, Hyderabad (IN); Corentin Derbois, Palo Alto, CA (US); Madhusudhan Ravi, Palo Alto, CA (US); Gopakumar Pillai, Palo Alto, CA (US)

(73) Assignee: Nicira, Inc., Palo Alto, CA (US)

( * ) Notice: Subject to any disclaimer, the term of this patent is extended or adjusted under 35 U.S.C. 154(b) by 414 days.

(21) Appl. No.: 15/256,520

(22) Filed: Sep. 3, 2016

(65) Prior Publication Data

US 2017/0230262 A1    Aug. 10, 2017

(30) Foreign Application Priority Data

Feb. 10, 2016   (IN) .............................. 201641004766

(51) Int. Cl.
*H04L 12/26* (2006.01)
*H04L 29/06* (2006.01)

(52) U.S. Cl.
CPC .......... *H04L 43/0811* (2013.01); *H04L 43/10* (2013.01); *H04L 69/16* (2013.01)

(58) Field of Classification Search
CPC ..... H04L 43/0811; H04L 43/10; H04L 43/14; H04L 69/16; H04L 69/22
See application file for complete search history.

(56) References Cited

U.S. PATENT DOCUMENTS

| 8,862,774 B2* | 10/2014 | Vasseur ................. H04L 45/026 370/241 |
| 9,141,625 B1* | 9/2015 | Thornewell .......... G06F 16/119 |
| 2005/0063303 A1* | 3/2005 | Samuels ................ H04L 69/16 370/229 |
| 2006/0153066 A1* | 7/2006 | Saleh ................... H04J 14/0295 370/216 |
| 2008/0025226 A1* | 1/2008 | Mogul ................ H04L 43/0811 370/242 |
| 2011/0131654 A1* | 6/2011 | Taneja ................ H04L 63/1416 726/23 |
| 2012/0265866 A1* | 10/2012 | Stanciu ............... G06F 11/3003 709/223 |
| 2013/0124607 A1* | 5/2013 | Griffith ................... H04L 43/10 709/203 |
| 2013/0219045 A1* | 8/2013 | Agarwal ............... H04L 45/026 709/224 |
| 2014/0289403 A1* | 9/2014 | Jin ......................... H04L 67/22 709/224 |
| 2017/0155575 A1* | 6/2017 | Bertucci ................ H04L 45/28 |
| 2017/0171066 A1* | 6/2017 | Hao ........................ H04L 45/44 |

* cited by examiner

*Primary Examiner* — Joe Chacko
(74) *Attorney, Agent, or Firm* — Patterson + Sheridan, LLP

(57) ABSTRACT

Techniques disclosed herein provide an approach for diagnosing problems in a network connection established between applications running on two endpoints. In one embodiment, upon identification of a potential issue in the network connection, a connection detector is triggered in one of the endpoints and requests a kernel of that endpoint to transmit an on-demand, non-invasive packet to the other endpoint. The connection detector then determines whether the application running on the other endpoint is available via the connection based on whether an acknowledgment packet is received from the other endpoint after the transmission of the non-invasive packet.

13 Claims, 4 Drawing Sheets

ON-DEMAND CONNECTION PING

RELATED APPLICATION

Benefit is claimed under 35 U.S.C. 119(a)-(d) to Foreign Application Serial No. 201641004766 filed in India entitled "ON-DEMAND CONNECTION PING", filed on Feb. 10, 2016 by Nicira, Inc., which is herein incorporated in its entirety by reference for all purposes.

BACKGROUND

Connectivity issues often arise when a Transmission Control Protocol (TCP) receiver waits to receive data but does not receive the data. Such connectivity issues are typically debugged using the ping tool, which identifies whether network communication with a destination computer is working, and a connection detector known as traceroute, which identifies the route taken by packets. Such tools provide the capability to test network and device reachability. However, ping and traceroute may not work if intermediate networks between the sending and receiving computers do not allow Internet Control Message Protocol (ICMP) packets generated by ping and traceroute for security reasons. In addition, ping and traceroute do not test the TCP state of the connection at the remote end, i.e., it is not tested whether the connection is in a state where data can be sent and received.

SUMMARY

One embodiment provides a computer-implemented method of diagnosing problems in a network connection between a first application running on system software of a first endpoint and a second application running on system software of a second endpoint. The method generally includes identifying, at the first endpoint, a potential connection issue in the network connection. The method further includes responsive to the identifying of the potential connection issue, requesting a kernel component of the system software of the first endpoint to transmit a non-invasive packet from the first endpoint to the second endpoint, where the non-invasive packet is an on-demand packet that the kernel component is configured to transmit in response to an application or user request. In addition, the method includes determining whether the second application is available via the network connection based on whether a packet is received by the first endpoint from the second endpoint in response to the transmission of the non-invasive packet.

Further embodiments include a non-transitory computer-readable storage medium storing instructions that when executed by a computer system cause the computer system to perform the method set forth above, and a computer system programmed to carry out the method set forth above.

DETAILED DESCRIPTION

Embodiments presented herein provide techniques for diagnosing problems in a network connection established between applications running on two endpoints. In one embodiment, upon identification at one of the endpoints of a potential issue in the network connection, a connection detector is triggered and requests a kernel of that endpoint to transmit an on-demand, non-invasive packet to the other endpoint. A "non-invasive" packet is used herein to refer to a packet that is received and processed by the remote kernel, but not sent to the remote application. An "on-demand" non-invasive packet is used herein to refer to a non-invasive packet that is transmitted responsive to a request by an application or a request by a user interacting with a user interface. In one embodiment, the on-demand non-invasive packet may be a packet with a message of 0 length, such as a Transmission Control Protocol (TCP) keep-alive packet. Such packets elicit an acknowledgment response from the remote endpoint, but are not sent onto remote applications which are unaware of the packets. The connection detector determines whether the remote application is available via the connection based on whether an acknowledgment packet is received from the remote endpoint after transmission of the non-invasive packet. That is, the non-invasive packet is sent to the remote connection to determine if the connection is alive based on whether the remote ends responds to the packet (in which case the connection determined to be active) or not (in which case the connection is determined to be broken). Remedial measures, such as re-establishing the connection, may be taken if it is determined that the current connection has been broken.

Reference will now be made in detail to several embodiments, examples of which are illustrated in the accompanying figures. It is noted that wherever practicable similar or like reference numbers may be used in the figures and may indicate similar or like functionality. The figures depict embodiments for purposes of illustration only. One skilled in the art will readily recognize from the following description that alternative embodiments of the structures and method illustrated herein may be employed without departing from the principles described herein.

Figure 1:
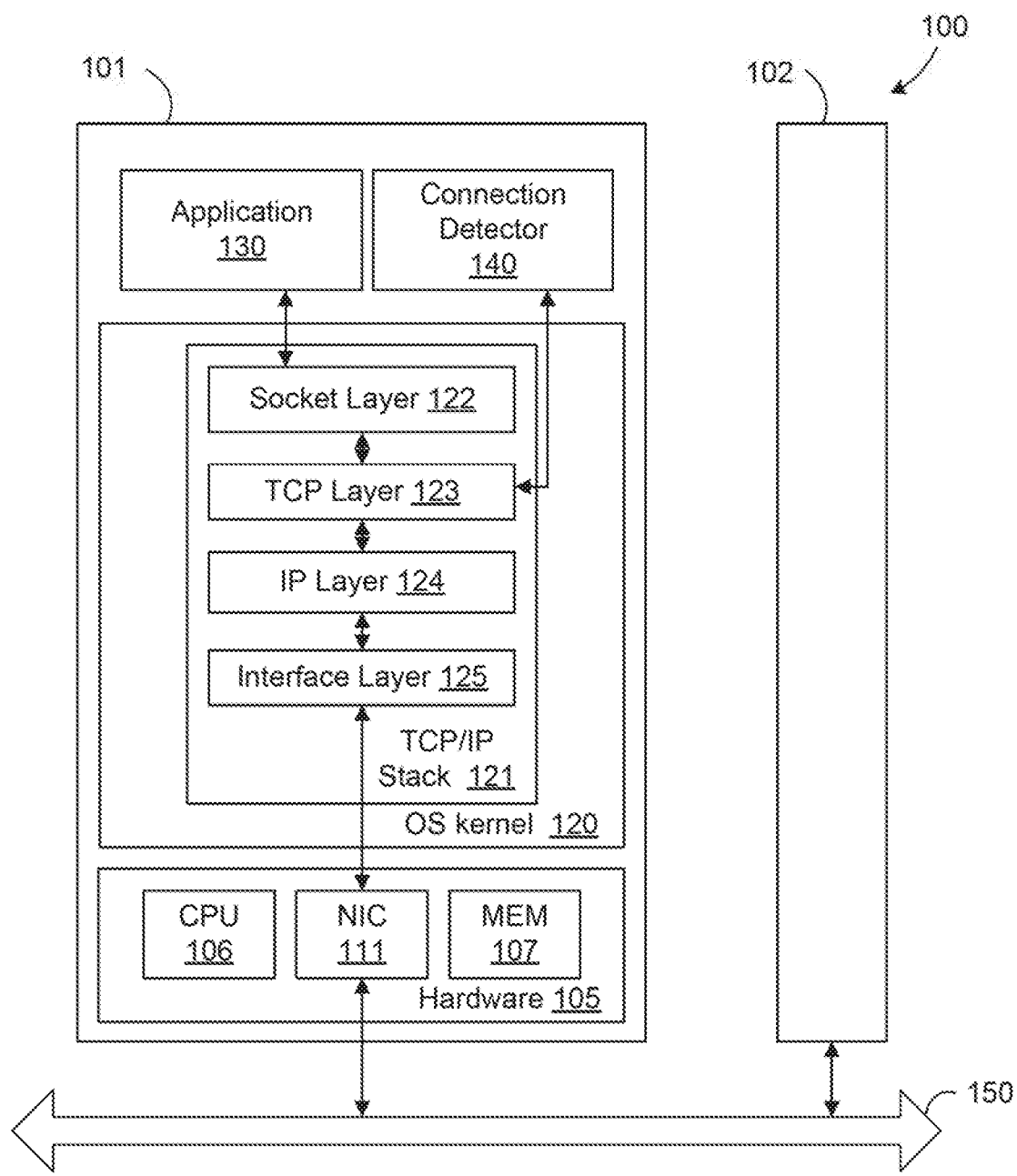
FIG. 1 illustrates components of a system in which an embodiment may be implemented.

FIG. 1 illustrates components of a system 100 in which an embodiment may be implemented. As shown, system 100 includes a first server computer 101 in communication with a second server computer 102. Servers 101-102 may be constructed on conventional hardware platforms, and only components of server 101 are shown for conciseness. Further, servers 101-102 are used herein as examples of endpoints, but it should be understood that techniques disclosed herein are also applicable to other types of endpoints, such as personal computers (PCs), smart phones, tablets, and the like.

Illustratively, hardware 105 of server 101 includes a central processing unit (CPU) 106 that retrieves and executes programming instructions stored in a memory 107 and also stores and retrieves application data residing in memory 107. The hardware 105 further includes a network interface controller (NIC) 111 connecting server 101 to a network 150, such as the Internet or a local area network (LAN). In addition, the hardware 105 may also include an I/O device interface (not shown) connecting I/O devices (e.g., keyboard, display and mouse devices) to server 101.

As shown, an operating system kernel 120 is executed in server 101, and an application 130 and a connection detector 140 run on the operating system. The operating system may be any feasible operating system, and Linux® is taken as an example. Although only application 130 and connection detector 140 are shown, it should be understood that any number of applications may run on the operating system. Operating system kernel 120 includes a TCP/IP stack 121, which as shown is a Linux® TCP/IP stack for illustratively purposes. In other embodiments, alternative TCP/IP stacks may be employed. TCP/IP stack 121 includes a socket layer 122, a TCP layer 123, an IP layer 124, and an interface layer 125, which are standard layers of the Linux® TCP/IP stack. The header of an upper layer is appended to the packet when data is passed from the upper layer to a lower layer, and the header of the lower layer is stripped off when data is passed from a lower layer to an upper layer. Socket layer 122 provides an interface between applications and lower layers of TCP/IP stack 121 in the operating system kernal, with a socket being created for each connection that is established. TCP and IP layers 123-124 implement the TCP and IP protocols, respectively. Interface layer 125 includes a network device driver that sends outgoing packets from IP layer 124 to NIC 111 and hands incoming packets from NIC 111 to IP layer 124.

In one embodiment, connection detector 140 is a script or command-line application triggered upon the detection of a potential connection issue, by application 130 or another application that knows the port numbers of the TCP connection, and connection detector 140 is configured to request TCP/IP stack 121 (and TCP layer 123 specifically) to transmit an on-demand, non-invasive packet to server 102 to test the connection between application 130 and a remote application running on server 102. For example, application 130 or another application may determine that certain data that application 130 is waiting for has not been received for more than a threshold amount of time, indicating a potential connection issue, and call connection detector 140. In an alternative embodiment, connection detector 140 itself, or some other system-wide watchdog, may identify potential connection issues and then transmit the non-invasive packet to TCP/IP stack 121. For example, the connection detector 140 or system-wide watchdog may periodically walk through all connections in the system to determine whether connections have been idle for a given length of time, and call connection detector 140 to check if the other end is active if any connections have been idle for the given length of time. In yet another embodiment, an administrator may manually request transmission of the on-demand non-invasive packet via, e.g., a user interface that displays potential connection issues and permits the administrator to request the transmission of the non-invasive packet to diagnose a particular potential connection issue by clicking on the displayed connection issue.

In one embodiment, the non-invasive packet sent by connection detector 140 to determine whether the connection has been broken is a packet with a message of 0 length, such as the TCP keep-alive packet that elicits an acknowledgment response from server 102 but is not forwarded to the remote application. Connection detector 140 then determines whether the remote application is available via the connection based on whether an acknowledgment message is received from server 102 in response to the keep-alive packet and takes remedial action, such as re-establishing the connection, if it is determined that the connection has terminated.

It should be understood the keep-alive message discussed above that is transmitted in response to potential connection issues is distinguishable from the typical keep-alive routine, which is internal to TCP and cannot be initiated explicitly on demand to diagnose a connection issue. That is, unlike the typical TCP keep-alive routines, which a user merely enables and configures for individual sockets or all connections, techniques disclosed herein provide an on-demand keep-alive message that can be sent like a ping to diagnose connection issues. In addition, the typical TCP keep-alive routines power down the connection if no response is received after three tries, whereas embodiments disclosed herein do not necessarily power down the connection.

It should further be understood that, by sending the TCP keep-alive packet via the same connection that was established, connection detector 140 is able to gather both L3 reachability information indicating whether the destination server is reachable and L4 reachability information indicating whether the destination application or service is alive and listening on a particular port or connection established at a particular port. This is in contrast to the typical approach that creates a new connection and pings the remote server using the new connection, which is not able to determine L4 reachability. For example, if the remote server crashed and rebooted, then sending a ping over a new connection would merely indicate that the remote server is reachable and not provide reachability information on the application that was terminated (and perhaps restarted) as a result of the crash.

Figure 2:
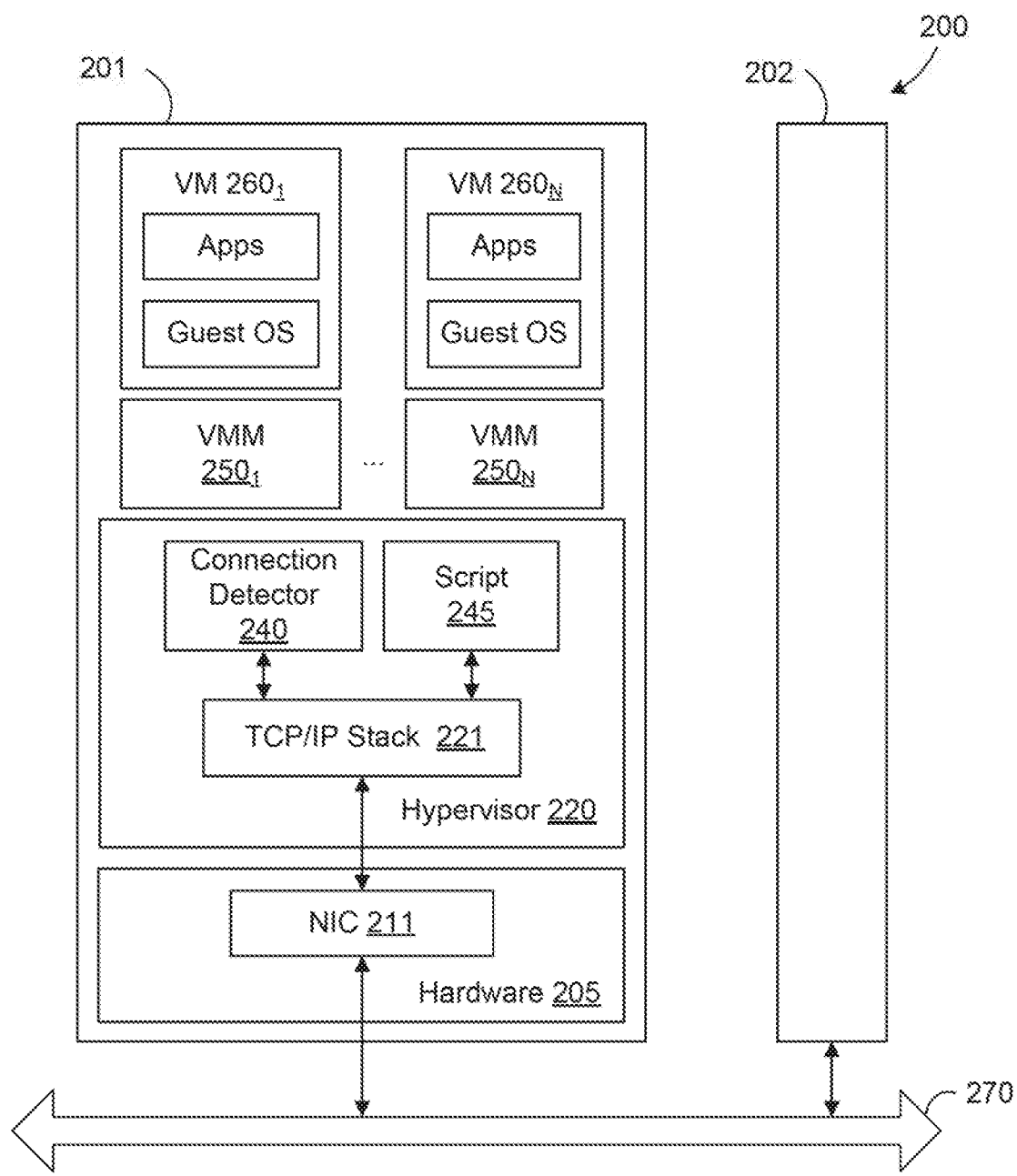
FIG. 2 illustrates components of a virtualized system in which an alternative embodiment may be implemented.

FIG. 2 illustrates components of a virtualized system 200 in which an alternative embodiment may be implemented. As shown, virtualized system 200 includes a host server 201 in communication with another host server 202. Host server 101 is configured to deliver virtualization-based distributed services to information technology environments. One or both of host server 201 and 202 may be constructed on conventional hardware platforms that include one or more central processing units, memory, and network interface cards (e.g., NIC 211), similar to those discussed above with respect to FIG. 1. Only the components of host server 201 are shown for conciseness.

Illustratively, a virtualization layer (hypervisor 220) that runs in host server 201 abstracts processor, memory, storage, and/or networking resources into multiple virtual machines (e.g., VMs $260_{1-N}$) that run side-by-side on the same physical host server 201. That is, the virtualization software partitions host server 201 into multiple secure and portable virtual machines that run on the same physical server. Each of the VMs $260_{1-N}$ represents a complete system—with processors, memory, networking, storage, and/or BIOS. Each of the VMs $260_{1-N}$ also includes a software-based virtual network adapter that is logically connected to a physical network adapter (e.g., NIC 211) included in host server 201, which provides network access for the virtual machine. Virtualization layer 240 further includes a TCP/IP stack 221, which may be any feasible TCP/IP stack such as one similar to the Linux TCP/IP stack 121 discussed above.

As shown, connection detector 240 is triggered upon the detection of a potential connection issue, and connection detector 240 is configured to request TCP/IP stack 241 (and a TCP layer in TCP/IP stack 241 specifically) to transmit an on-demand, non-invasive packet to server 102 to test the connection between application 130 and a remote application running on server 102. Connection detector 240 determines whether the remote application is available via the connection based on whether a response is received from server 102 and remedial action, such as re-establishing the connection, may be taken if connection detector 240 determines that the connection has been terminated. For example, a live migration operation may be initiated to transfer VMs between host servers 201 and 202. A script 245 may be executing the migration operation, and script 245 may determine that after a given amount of time (e.g., 30 minutes), the operation has not completed. In response, another part of script 245, or another script, may be called to act as connection detector 240 that sends a TCP keep-alive packet to the remote server. Connection detector 240 then determines whether the connection has been broken based on whether an acknowledgment message is received in response to the TCP keep-alive packet, and appropriate remedial measures may be taken if the connection is broken.

Figure 3:
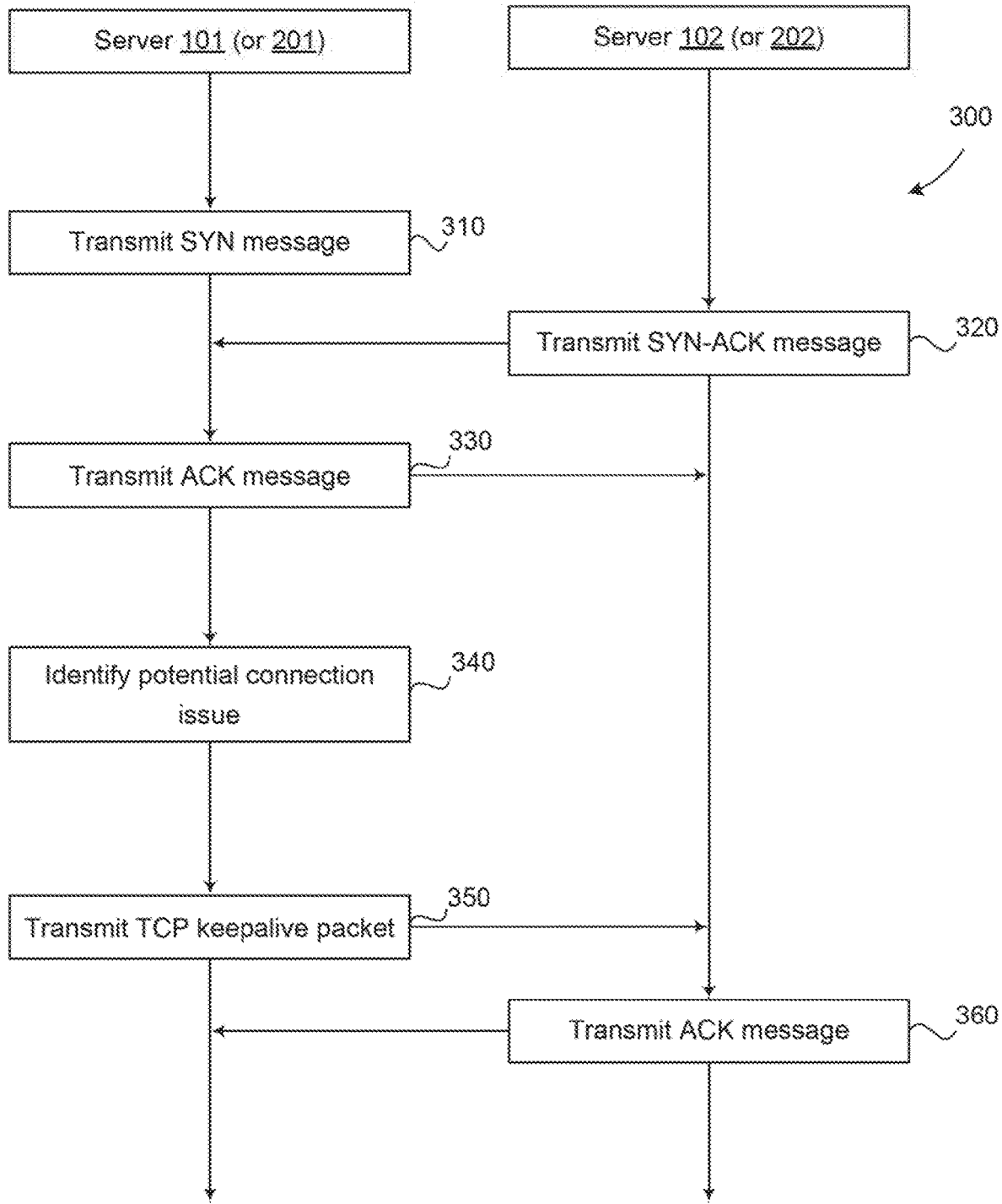
FIG. 3 illustrates an approach for establishing a TCP connection and using on-demand TCP keep-alive packet(s) to diagnose TCP network connection issues, according to an embodiment.

FIG. 3 illustrates an approach for establishing a TCP connection and using on-demand TCP keep-alive packet(s) to diagnose TCP network connection issues, according to an embodiment. As shown, the TCP connection is first established with a three-way handshake in which server 101 (or 201) transmits a SYNchronize packet to server 102 (or 202) at step 310, server 102 replies with a SYNchronize-ACKnowledgment message at step 320, and server 101 further sends an ACKnowledgment message at step 330 after receiving the SYN-ACK message from server 201. Thereafter, a TCP socket connection is established. In the ESTABLISHED state, both servers 101-102 maintain a local recv-window and track the remote recv-window. A packet that is received is acceptable if its sequence number lies within a read-window. Otherwise, the packet is discarded.

At step 340, a potential connection issue is identified on the server 101 side. The connection issue may be identified in any feasible manner, and the particular method of identifying connection issues may be application specific. For example, an application running on server 101 may wait to receive data from server 102 but not receive the data for a given amount of time. As another example, a script for migrating virtual machines from host server 201 to host server 202 may determine that no progress is being made in the migration for a given amount of time. As yet another example, connection detector 140 or a system-wide watchdog may periodically walk through all connections in the system to determine whether connections have been idle for a given length of time, indicating a potential connection issue. Although illustrated as occurring in server 101 (or 201), it should be understood that the potential connection issue may also be identified on the other server 102 (or 202) side.

At step 350, connection detector 140, which may be a script or command-line application, is triggered in response to the identification of the potential connection issue and requests that server 101's TCP/IP stack transmit a TCP keep-alive packet to server 102. As discussed, the keep-alive packet is a type of packet defined in the TCP protocol with a header and a sequence number set to one less than the connection's current sequence number, but no payload, and the keep-alive packet elicits an acknowledgment from the remote end. It should be understood the identifying and transmitting of the keep-alive packet at steps 340-350 is unlike the typical keep-alive routine, which is internal to TCP and cannot be initiated explicitly on demand to diagnose a connection issue. That is, unlike the typical TCP keep-alive routines, which do permit keep-alive packets to be sent on demand in response to a request, techniques disclosed herein provide an on-demand keep-alive message that can be sent like a ping to diagnose connection issues. In addition, the typical TCP keep-alive routines power down the connection if no response is received after three tries, whereas embodiments disclosed herein may take remedial rather than power down the connection.

At step 360, server 102 transmits an ACK message back to server 101. This assumes that the TCP socket connection has not been broken. If the connection has been broken, then no ACK message will be sent back to server 101. Server 101 may wait for a given amount of time for an ACK message and conclude that the connection has been broken if no ACK message is received from server 102 with the amount of time. In such a case, server 101 may take remedial actions such as reestablishing the connection, issuing a warning, etc. It should be understood that the particular remedial action taken will generally be application dependent.

Figure 4:
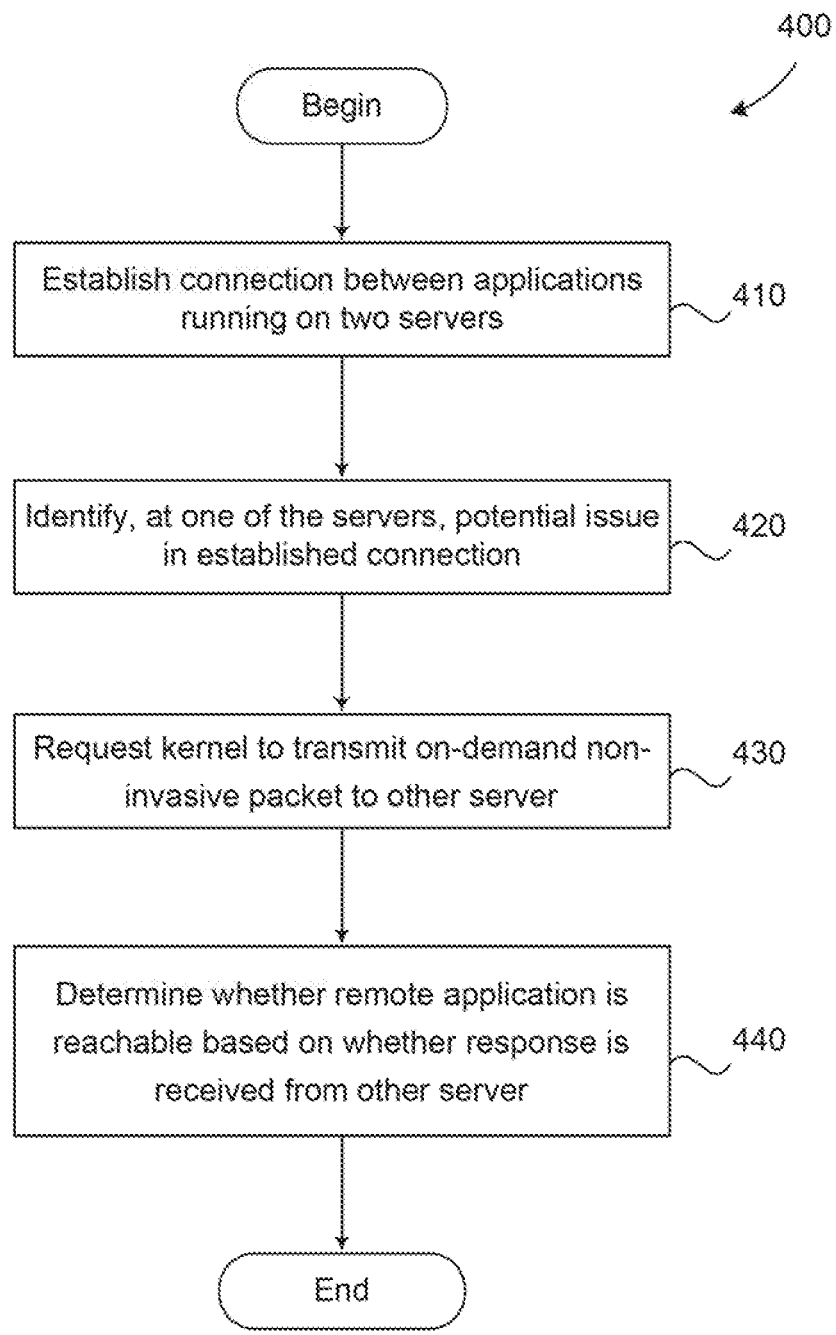
FIG. 4 is a flow diagram illustrating a method for diagnosing problems in a network connection, according to an embodiment.

FIG. 4 is a flow diagram illustrating a method 400 for diagnosing problems in a network connection, according to an embodiment. As shown, method 400 begins at step 410, where the network connection is established between applications running on two distinct servers. In the case of TCP, the three-way handshake discussed above with respect to FIG. 3 may be used to establish a socket connection.

At step 420, a potential issue in the established connection is identified at one of the servers. As discussed, a number of different techniques may be used to identify potential connection issues, such as determining that expected data has not being received from a sender for a given amount of time, that a VM migration has not made progress for a given amount of time, that a connection has been idle for a given length of time, and the like.

At step 430, a connection detector requests a kernel of the server to transmit an on-demand non-invasive packet to the other endpoint. As discussed, the connection detector may be a script or command line application which is triggered in response to the identification of the potential connection issue at step 420. In yet another embodiment, an administrator may manually request transmission of the on-demand non-invasive packet via, e.g., a user interface.

The non-invasive packet includes a message of 0 length and is intended to elicit a response message (e.g., an ACK message) from the remote end. For example, the non-invasive packet may include a typical packet header but not a payload. When such a packet is received, it is not actually passed to an application and, as a result, is non-invasive. Instead, the kernel TCP/IP stack simply sends the response message (e.g., an ACK message), indicating that the non-invasive packet has been received. In one embodiment, the non-invasive packet may be a TCP keep-alive packet.

In another embodiment, the non-invasive packet is transmitted in-band using the connection established at step 410. That is, the already established network connection, rather than a different or new connection, is used to transmit the non-invasive packet. Doing so permits the connection detector to gather both L3 and L4 reachability information. As discussed, L3 reachability indicates whether the destination server is reachable, while L4 reachability indicates whether the destination application or service is alive and listening on a particular port or connection established at a particular port. As a result, techniques disclosed herein are able to determine transient failures such as when the remote server crashes and reboots, which cannot be identified by the typical approach of sending a ping over a new connection, as the ping would only indicate the remote server is reachable rather than following the exact path of packets sent via the previously established network connection. Further, such an out-of-band approach that creates a new connection may not work in secure networks where only authenticated or explicitly allowed flows are tolerated.

At step 440, the connection detector determines whether the remote application is reachable via the connection based on whether a packet is received back from the remote server in response to the transmission of the non-invasive packet. In the case of a TCP keep-alive packet being sent at step 430, the other server may respond by sending an ACK message back if the remote endpoint, such as an application or service, is reachable. On the other hand, if the connection has been broken, then no ACK message will be sent back, and the connection detector determines after waiting a given amount of time that the remote endpoint is not reachable via the connection.

At step 450, if the remote endpoint is determined to not be reachable, then the connection detector triggers remedial actions. As discussed, the particular action taken will generally be application dependent. For instance, the connection may be re-established, a notification may be displayed to the user that the connection has been terminated, etc.

Although several reference examples, including live VM migration, are described above, it should be understood that techniques disclosed herein for diagnosing network connection issues may be employed in a wide variety of circumstances, such as a web server detecting if a client exists, a remote file server detecting if a storage array is active, etc.

Advantageously, techniques disclosed herein provide an on-demand non-invasive technique for diagnosing network connection issues. The non-invasive packet(s) are sent in response to requests, and the non-invasive packet(s) are processed entirely by the remote kernel while being transparent to the remote application. Further, an in-band approach is disclosed in which an established connection is used to transmit non-invasive packet(s), rather than a different or new connection. As a result, both L3 and L4 reachability can be diagnosed.

The various embodiments described herein may employ various computer-implemented operations involving data stored in computer systems. For example, these operations may require physical manipulation of physical quantities usually, though not necessarily, these quantities may take the form of electrical or magnetic signals where they, or representations of them, are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a computer or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including smart phones, tablets, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory), a CD (Compact Discs), CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

In addition, while described virtualization methods have generally assumed that virtual machines present interfaces consistent with a particular hardware system, persons of ordinary skill in the art will recognize that the methods described may be used in conjunction with virtualizations that do not correspond directly to any particular hardware system. Virtualization systems in accordance with the various embodiments, implemented as hosted embodiments, non-hosted embodiments, or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Certain embodiments as described above involve a hardware abstraction layer on top of a host computer. The hardware abstraction layer allows multiple contexts or virtual computing instances to share the hardware resource. In one embodiment, these virtual computing instances are isolated from each other, each having at least a user application running therein. The hardware abstraction layer thus provides benefits of resource isolation and allocation among the virtual computing instances. In the foregoing embodiments, virtual machines are used as an example for the virtual computing instances and hypervisors as an example for the hardware abstraction layer. As described above, each virtual machine includes a guest operating system in which at least one application runs. It should be noted that these embodiments may also apply to other examples of virtual computing instances, such as containers not including a guest operation system, referred to herein as "OS-less containers" (see, e.g., www.docker.com). OS-less containers implement operating system-level virtualization, wherein an abstraction layer is provided on top of the kernel of an operating system on a host computer. The abstraction layer supports multiple OS-less containers each including an application and its dependencies. Each OS-less container runs as an isolated process in userspace on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

What is claimed is:

1. A computer-implemented method of diagnosing problems in a network connection between a first application running on system software of a first endpoint and a second application running on system software of a second endpoint, the method comprising:
   identifying, at the first endpoint, a potential connection issue in the network connection;
   responsive to the identifying of the potential connection issue, requesting a kernel component of the system software of the first endpoint to transmit a non-invasive packet from the first endpoint to the second endpoint, wherein the non-invasive packet is an on-demand packet that the kernel component of the system software of the first endpoint is configured to transmit in response to an application or user request, wherein the non-invasive packet is transmitted in-band via the network connection, wherein the non-invasive packet includes a header but not a payload; and
   determining whether the second application is available via the network connection based on whether a packet is received by the first endpoint from the second endpoint in response to the transmission of the non-invasive packet, wherein the non-invasive packet is processed by a kernel component of the system software of the second endpoint but not transmitted to the second application.

2. The method of claim 1, wherein the network connection is a Transmission Control Protocol (TCP) connection, and wherein the non-invasive packet is a TCP keep-alive packet.

3. The method of claim 1, wherein the request to transmit the on-demand non-invasive packet is made by a connection detector triggered in response to the identifying of the potential connection issue.

4. The method of claim 1, wherein the request to transmit the on-demand non-invasive packet is made by a user interacting with a user interface in response to the identifying of the potential connection issue.

5. The method of claim 1,
   wherein the network connection is established for a virtual machine live migration operation, and
   wherein the potential connection issue is identified when the live migration operation does not make progress for a given amount of time.

6. The method of claim 1, further comprising:
   in response to determining the second application is not available, establishing a new network connection between the first application and the second application.

7. A non-transitory computer-readable storage medium containing a program which, when executed by one or more processors, performs operations for diagnosing problems in a network connection between a first application running on system software of a first endpoint and a second application running on system software of a second endpoint, the operations comprising:
   identifying, at the first endpoint, a potential connection issue in the network connection;
   responsive to the identifying of the potential connection issue, requesting a kernel component of the system software of the first endpoint to transmit a non-invasive packet from the first endpoint to the second endpoint, wherein the non-invasive packet is an on-demand packet that the kernel component of the system software of the first endpoint is configured to transmit in response to an application or user request, wherein the non-invasive packet is transmitted in-band via the network connection, wherein the non-invasive packet includes a header but not a payload; and
   determining whether the second application is available via the network connection based on whether a packet is received by the first endpoint from the second endpoint in response to the transmission of the non-invasive packet, wherein the non-invasive packet is processed by a kernel component of the system software of the second endpoint but not transmitted to the second application.

8. The computer-readable storage medium of claim 7, wherein the network connection is a Transmission Control Protocol (TCP) connection, and wherein the non-invasive packet is a TCP keep-alive packet.

9. The computer-readable storage medium of claim 7, wherein the request to transmit the on-demand non-invasive packet is made by a connection detector triggered in response to the identifying of the potential connection issue.

10. The computer-readable storage medium of claim 7,
    wherein the network connection is established for a virtual machine live migration operation, and
    wherein the potential connection issue is identified when the live migration operation does not make progress for a given amount of time.

11. The computer-readable storage medium of claim 7, the operations further comprising:
    in response to determining the second application is not available, establishing a new network connection between the first application and the second application.

12. A first endpoint, comprising:
    a processor; and
    a memory, wherein the memory includes a program executable in the processor to perform operations for diagnosing problems in a network connection between a first application running on system software of the first endpoint and a second application running on system software of a second endpoint, the operations comprising:
       identifying a potential connection issue in the network connection, responsive to the identifying of the potential connection issue, requesting a kernel component of the system software of the first endpoint to transmit a non-invasive packet from the first endpoint to the second endpoint, wherein the non-invasive packet is an on-demand packet that the kernel component of the system software of the first endpoint is configured to transmit in response to an application or user request, wherein the non-invasive packet is transmitted in-band via the network connection, wherein the non-invasive packet includes a header but not a payload, and determining whether the second application is available via the network connection based on whether a packet is received by the first endpoint from the second endpoint in response to the transmission of the non-invasive packet, wherein the non-invasive packet is processed by a kernel component of the system software of the second endpoint but not transmitted to the second application.

13. The first endpoint of claim 12, wherein the request to transmit the on-demand non-invasive packet is made by a connection detector triggered in response to the identifying of the potential connection issue.

* * * * *